(12) United States Patent
Yoo

(10) Patent No.: US 10,684,355 B2
(45) Date of Patent: Jun. 16, 2020

(54) RADAR MODULE, AND VEHICLE RADAR DEVICE COMPRISING SAME

(71) Applicant: LG INNOTEK CO., LTD., Seoul (KR)

(72) Inventor: Hong Gil Yoo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 292 days.

(21) Appl. No.: 15/756,466

(22) PCT Filed: Aug. 1, 2016

(86) PCT No.: PCT/KR2016/008473
§ 371 (c)(1),
(2) Date: Feb. 28, 2018

(87) PCT Pub. No.: WO2017/039161
PCT Pub. Date: Mar. 9, 2017

(65) Prior Publication Data
US 2018/0341005 A1 Nov. 29, 2018

(30) Foreign Application Priority Data
Aug. 31, 2015 (KR) .......................... 10-2015-0122697

(51) Int. Cl.
*G01S 7/282* (2006.01)
*G01S 7/03* (2006.01)
(Continued)

(52) U.S. Cl.
CPC .......... *G01S 7/282* (2013.01); *B60R 21/0134* (2013.01); *G01S 7/03* (2013.01);
(Continued)

(58) Field of Classification Search
CPC combination set(s) only.
See application file for complete search history.

(56) References Cited

U.S. PATENT DOCUMENTS

| 6,583,753 B1 * | 6/2003 | Reed ................. G01S 13/325 342/70 |
| 2003/0164791 A1 * | 9/2003 | Shinoda ............... H01Q 1/3233 342/70 |

(Continued)

FOREIGN PATENT DOCUMENTS

| KR | 10-2011-0126939 A | 11/2011 |
| KR | 10-2012-0012617 A | 2/2012 |

(Continued)

OTHER PUBLICATIONS

International Search Report in International Application No. PCT/KR2016/008473, filed Aug. 1, 2016.

*Primary Examiner* — Mamadou L Diallo
(74) *Attorney, Agent, or Firm* — Saliwanchik, Lloyd & Eisenschenk

(57) ABSTRACT

A radar module according to an embodiment of the present invention comprises an antenna unit including a transmitting antenna unit and a receiving antenna unit, and a signal processing unit connected to the antenna unit and processing a transmission signal and a reception signal, wherein the transmitting antenna unit consists of a long-range transmitting antenna and a short-range transmitting antenna of a single channel, and the receiving antenna unit consists of a long-range receiving antenna and a short-range receiving antenna of a plurality of channels.

20 Claims, 9 Drawing Sheets

(51) Int. Cl.
*G01S 13/931* (2020.01)
*H01Q 1/32* (2006.01)
*G01S 7/285* (2006.01)
*G01S 13/93* (2020.01)
*B60R 21/0134* (2006.01)
*H01Q 21/06* (2006.01)
*G01S 7/02* (2006.01)

(52) U.S. Cl.
CPC .............. *G01S 7/285* (2013.01); *G01S 13/93* (2013.01); *G01S 13/931* (2013.01); *H01Q 1/3233* (2013.01); *H01Q 21/065* (2013.01); *G01S 2007/027* (2013.01)

(56) References Cited

U.S. PATENT DOCUMENTS

| | | | |
|---|---|---|---|
| 2011/0285573 A1* | 11/2011 | Jeong | G01S 13/931 342/70 |
| 2012/0050092 A1* | 3/2012 | Lee | G01S 13/34 342/146 |
| 2012/0188117 A1 | 7/2012 | Jeong | |
| 2012/0235857 A1* | 9/2012 | Kim | G01S 13/345 342/134 |
| 2013/0187808 A1 | 7/2013 | Kim et al. | |
| 2013/0300606 A1* | 11/2013 | Kim | G01S 13/02 342/385 |
| 2014/0306840 A1 | 10/2014 | Koerber et al. | |
| 2015/0042507 A1* | 2/2015 | Jeong | G01S 13/931 342/70 |
| 2017/0047649 A1* | 2/2017 | Himmelstoss | H01Q 21/28 |

FOREIGN PATENT DOCUMENTS

| | | |
|---|---|---|
| KR | 10-2012-0085989 A | 8/2012 |
| KR | 10-2012-0106567 A | 9/2012 |
| KR | 10-2013-0085303 A | 7/2013 |
| KR | 10-2014-0077155 A | 6/2014 |
| KR | 10-2015-0017976 A | 2/2015 |

* cited by examiner

RADAR MODULE, AND VEHICLE RADAR DEVICE COMPRISING SAME

CROSS-REFERENCE TO RELATED APPLICATIONS

This application is the U.S. national stage application of International Patent Application No. PCT/KR2016/008473, filed Aug. 1, 2016, which claims priority to Korean Application No. 10-2015-0122697, filed Aug. 31, 2015, the disclosures of each of which are incorporated herein by reference in their entirety.

TECHNICAL FIELD

The present invention relates to a vehicle radar device, and more particularly to a vehicle radar device including a short range radar module and a long range radar module.

BACKGROUND ART

A radar device is applied to various technical fields, and recently is installed in a vehicle to improve a mobility of the vehicle. Such a radar device uses electromagnetic waves to detect information about the surrounding environment of a vehicle. In addition, by using the corresponding information for moving a vehicle, efficiency of the movement of the vehicle can be improved. To this end, the radar device includes an antenna to transmit and receive electromagnetic waves.

Meanwhile, a vehicle radar may be classified into a long range radar (LRR) and a short range radar (SRR), and in the case of LRR, a frequency of 77 GHz band is mainly used, and in the case of SRR, a 24 GHz band is mainly used.

In order for a vehicle radar including both a LRR and a SRR to secure a field of view (FOV) and detection distance for simultaneously detecting objects placed at a long distance and a short distance, it is necessary to dispose an optimal interval between antenna channels and secure an antenna gain.

DISCLOSURE

Technical Problem

The present invention is directed to providing a radar module including an optimal arrangement structure between antenna channels for simultaneously detecting a short distance and a long distance and a vehicle radar device including the same.

Technical Solution

One aspect of the present invention provides a radar module, including an antenna unit including a transmitting antenna unit and a receiving antenna unit, and a signal processing unit connected to the antenna unit and processing a transmission signal and a reception signal, wherein the transmitting antenna unit consists of a long-range transmitting antenna and a short-range transmitting antenna of a single channel, and the receiving antenna unit consists of a long-range receiving antenna and a short-range receiving antenna of a plurality of channels.

Another aspect of the present invention provides a vehicular radar device, including a case, a printed circuit board (PCB) which is accommodated in the case and in which an antenna unit is mounted, and the antenna unit including a transmitting antenna unit and a receiving antenna unit, wherein the transmitting antenna unit consists of a long-range transmitting antenna and a short-range transmitting antenna of a single channel, and the receiving antenna unit consists of a long-range receiving antenna and a short-range receiving antenna of a plurality of channels.

Advantageous Effects

According to an embodiment of the present invention, it is possible to detect objects at a short distance and at a long distance simultaneously by providing an arrangement structure of an optimal interval between antenna channels.

MODES OF THE INVENTION

Figure 1:
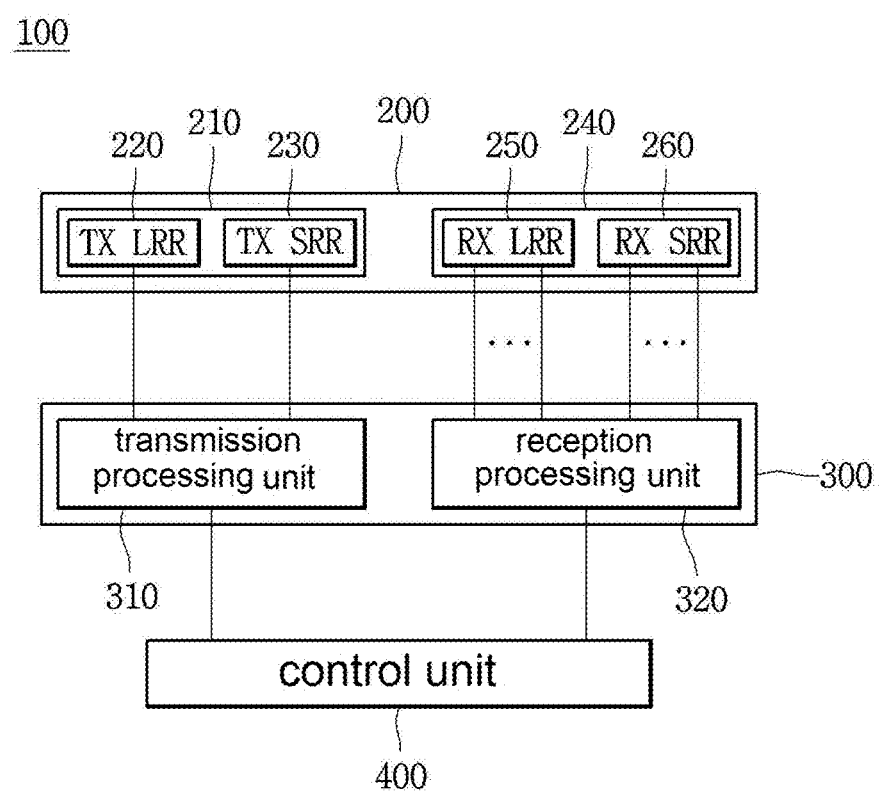
FIG. 1 is a block diagram illustrating an internal configuration of a radar module according to an embodiment of the present invention.

Hereinafter, exemplary embodiments of the present invention will be described in detail with reference to the accompanying drawings, wherein like reference numerals are used to designate identical or similar elements, and redundant description thereof will be omitted. The suffix "module" and "portion" of the components used in the following description are only given or mixed in consideration of ease of preparation of the description, and there is no meaning or role to be distinguished as it is from one another. Also, in the following description of the embodiments of the present invention, a detailed description of related arts will be omitted when it is determined that the gist of the embodiments disclosed herein may be obscured. Also, the accompanying drawings are included to provide a further understanding of the invention, are incorporated in, and constitute a part of this description, and it should be understood that the invention is intended to cover all modifications, equivalents, or alternatives falling within the spirit and scope of the invention.

Terms including ordinals, such as first, second, etc., may be used to describe various components, but the elements are not limited to these terms. The terms are used only for distinguishing one component from another.

When a component is referred to as being "connected" or "joined" to another component, it may be directly connected or joined to the other component, but it should be understood that other component may be present therebetween. When a component is referred to as being "directly connected" or "directly joined" to another component, it should be understood that other component may not be present therebetween.

A singular representation includes plural representations, unless the context clearly implies otherwise.

In the present application, terms such as "including" or "having" are used to specify the presence of features, numbers, steps, operations, components, parts, or combinations thereof described in the description. However, it should be understood that the terms do not preclude the presence or addition of one or more other features, numbers, steps, operations, components, parts, or combinations thereof.

FIG. 1 is a block diagram illustrating an internal configuration of a radar module according to an embodiment of the present invention.

Referring to FIG. 1, a radar module 100 may include an antenna unit 200, a signal processing unit 300, and a control unit 400.

The radar module 100 may perform a function of detecting a motion of an object in a peripheral area of a current position. That is, the radar module 100 may detect information about a surrounding environment via an electromagnetic wave, and may detect a movement of an object by a motion of the object.

The antenna unit 200 may include a transmitting antenna unit 210 and a receiving antenna unit 240. The transmitting antenna unit 210 may include a long-range transmitting antenna 220 and a short-range transmitting antenna 230, and the receiving antenna unit 240 may include a long-range receiving antenna 250 and a short-range receiving antenna 260.

The antenna unit 200 may perform a radio transmission and reception function of the radar module 100. That is, the antenna unit 200 may transmit transmission signals to the air and receive reception signals from the air. Here, the transmission signals indicate radio signals transmitted from the radar module 100. And the reception signals indicate radio signals which are input to the radar module 100 as the transmission signals is reflected by a target.

The transmitting antenna unit 210 may transmit transmission signals to the air. The transmitting antenna unit 210 may include the long-range transmitting antenna 220 and the short-range transmitting antenna 230 of a single channel.

The receiving antenna unit 240 may receive reception signals from the air. The receiving antenna unit 240 may include the long-range receiving antenna 250 and the short-range receiving antenna 260 of a plurality of channels.

The signal processing unit 300 may perform a radio processing function of the radar module 100. The signal processing unit 300 may process transmission signals and reception signals. The signal processing unit 300 may include a transmission processing unit 310 and a reception processing unit 320.

The transmission processing unit 310 may generate transmission signals from transmission data. The transmission processing unit 310 may output transmission signals to the transmitting antenna unit 210. The transmission processing unit 310 may include an oscillation unit (not shown). For example, the oscillation unit may include a voltage controlled oscillator (VCO) and an oscillator.

The reception processing unit 320 may receive reception signals from the receiving antenna unit 240. The reception processing unit 320 may generate reception data from the reception signals. The reception processing unit 320 may include a low noise amplifier (LNA; not shown) and an analog-to-digital converter (ADC; not shown). The LNA may low-noise amplify reception signals, and the ADC may convert reception signals from an analog signal to digital data to generate reception data.

The control unit 400 may drive the radar module 100. The control unit 400 may drive the radar module 100 while a vehicle is traveling. The control unit 400 controls the radar module 100 to determine whether or not an object is detected in a peripheral area of a current position. The control unit 400 may process transmission data and reception data. The control unit 400 may generate transmission signals from transmission data by controlling the transmission processing unit 310. The control unit 400 may generate reception signals from reception data by controlling the reception processing unit 320. The control unit 400 may synchronize transmission data and reception data. The control unit 400 may extract angular information, speed information, and distance information with respect to a target by performing a CFAR operation, a tracking operation, a target selection operation, etc. with reception data.

Figure 2:
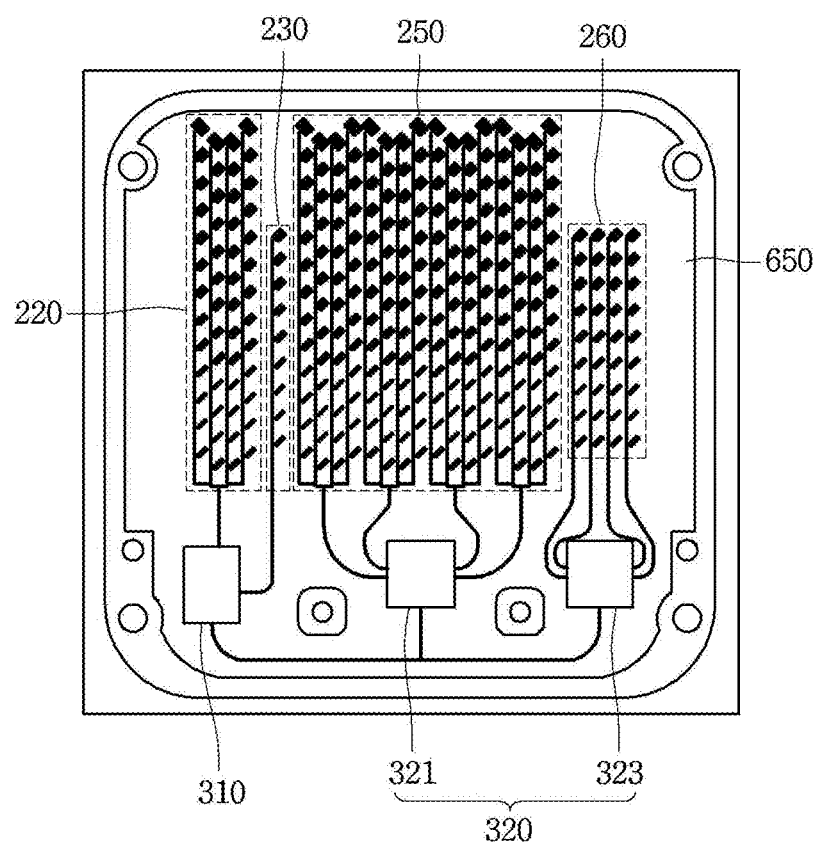
FIG. 2 is a plan view illustrating an example of implementing a radar module according to an embodiment of the present invention.

FIG. 2 is a plan view illustrating an example of implementing a radar module according to an embodiment of the present invention. Referring to FIG. 2, the radar module 100 may mount, on a PCB 650, a long-range transmitting antenna 220 and a short-range transmitting antenna 230 including a plurality of arrays, a long-range receiving antenna 250 and a short-range receiving antenna 260 including a plurality of arrays and a plurality of channels, a transmission processing unit 310 for processing signals of the long-range transmitting antenna 220 and the short-range transmitting antenna 230, and a reception processing unit 320 for processing signals of the long-range receiving antenna 250 and the short-range receiving antenna 260.

The radar module 100 may dispose the short-range transmitting antenna 230 between the long-range transmitting antenna 220 and the long-range receiving antenna 250, and may dispose the long-range receiving antenna 250 between the short-range transmitting antenna 230 and the short-range receiving antenna 260.

The length of the long-range transmitting antenna 220 may be longer than the length of the short-range transmitting antenna 230, and the length of the long-range receiving antenna 250 may be longer than the length of the short-range receiving antenna 260.

The transmission processing unit 310 is connected to the long-range transmitting antenna 220 and the short-range transmitting antenna 230, and is capable of outputting transmission signals, and may be connected to the reception processing unit 320 including a first reception processing unit 321 and a second reception processing unit 323.

The first reception processing unit 321 may be connected to the long-range receiving antenna 250 to receive reception signals and the second reception processing unit 323 may be connected to the short-distance receiving antenna 260 to receive reception signals. The first reception processing unit 321 may be disposed between the transmission processing unit 310 and the second reception processing unit 323.

Figure 3:
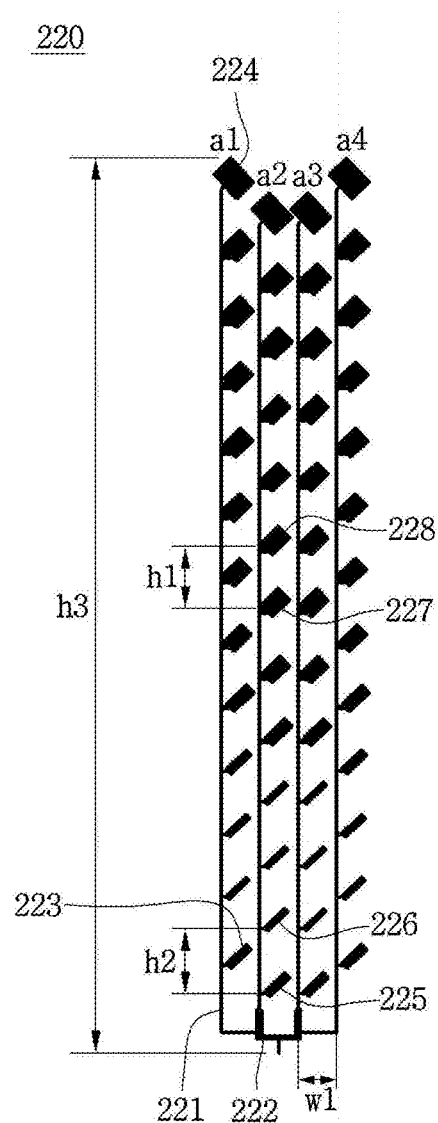
FIG. 3 is a plan view illustrating a long-range transmitting antenna according to an embodiment of the present invention.

FIG. 3 is a plan view illustrating a long-range transmitting antenna according to an embodiment of the present invention. Referring to FIG. 3, the long-range transmitting antenna 220 may include a plurality of arrays as a single channel. In an embodiment, a plurality of arrays may include four arrays and may be, for example, a first array a1, a second array a2, a third array a3 and a fourth array a4.

The long-range transmitting antenna 220 may include a plurality of feeder lines, a distributing unit, and a plurality of radiators. In the embodiment, the first array a1 may include a feeder line 221, a distributing unit 222, and a plurality of radiators.

The feeder line 221 may be disposed extending from the distributing unit 222 to supply signals to the plurality of radiators. The feeder line 221 is extended in one direction and is arranged in parallel to each other in the other direction. The feeder line 221 is disposed spaced apart from each other at a predetermined distance, and signals may be transmitted from one end to the other end of the feeder line 221.

The distributing unit 222 is disposed between the signal processing unit 300 and the feeder line 221 and may supply signals to the feeder line 221. The distributing unit 222 may distribute signals to the plurality of feeder lines.

The plurality of radiators may radiate signals from the long-range transmitting antenna 220. The plurality of radiators may form a radiation pattern of the long-range transmitting antenna 220. The plurality of radiators may be dispersedly disposed on the feeder line 221. The plurality of radiators may be arranged along the feeder line 221. As a result, signals may be supplied from the feeder line 221 to the radiators 220. The plurality of radiators may be made of a conductive material. Here, the plurality of radiators may include at least one of silver (Ag), palladium (Pd), platinum (Pt), copper (Cu), gold (Au), and nickel (Ni).

In an embodiment, a radiator 223 of an array a1 disposed at an edge of a plurality of arrays may be more spaced apart from the distributing unit 222 than a radiator 225 of an array a2 disposed in the middle. That is, in order to adjust the phases of the plurality of arrays to be equal, the radiator 223 of the array a1 disposed at the edge of the plurality of arrays may be disposed more spaced apart from the distributing unit 222 than the radiator 225 of the array a2 disposed in the middle.

In addition, the radiators 223 and 225 closest to the distributing unit 222 of the plurality of arrays may be disposed spaced apart from the feeder line 221. For example, the radiators 223 and 225 may be implemented as a gap coupled patch antenna to reduce an amount of radiation.

A patch of a radiator 224 disposed farthest from the distributing unit 222 of the plurality of arrays may have the largest size among patches of the plurality of radiators to reduce the side lobe of radio waves.

An interval w1 between the third array a3 and the fourth array a4 may be 1.6 mm or more and 1.8 mm or less, preferably 1.8 mm, but is not limited thereto.

In the embodiment, a length h3 of the first array a1 may be 40 mm or more and 42 mm or less, and preferably 41.6 mm, and an interval h2 between a first radiator 225 and a second radiator 226 of the second array a2 may be narrower than an interval h1 between a third radiator 227 and a fourth radiator 228, but is not limited thereto.

Figure 4:
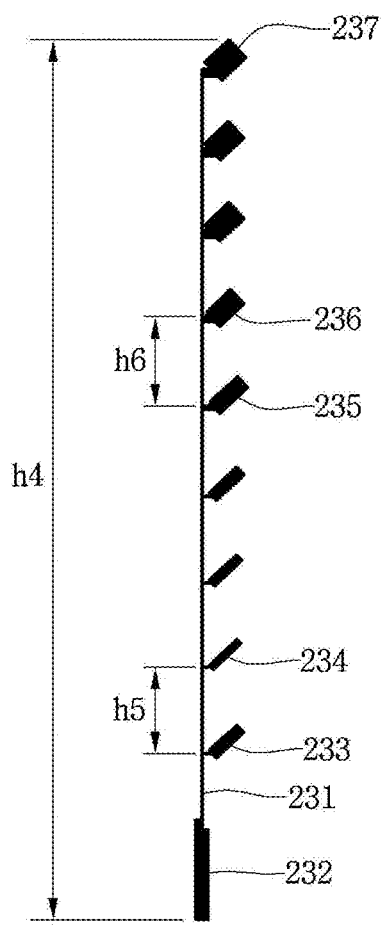
FIG. 4 is a plan view illustrating a short-range transmitting antenna according to an embodiment of the present invention.

FIG. 4 is a plan view illustrating a short-range transmitting antenna according to an embodiment of the present invention.

Referring to FIG. 4, the short-range transmitting antenna 230 may include one array as a single channel. The short-range transmitting antenna 230 may include a feeder line 231, a distributing unit 232, and a plurality of radiators. Descriptions of configurations overlapping with FIG. 3 are omitted.

In an embodiment, a radiator 233 closest to the distributing unit 232 among arrays may be disposed spaced apart from the feeder line 231. For example, the radiator 233 may be implemented as a gap coupled patch antenna to reduce an amount of radiation.

A patch of a radiator 237 disposed farthest from the distributing unit 232 among the arrays may have the largest size among patches of the plurality of radiators to reduce the side lobe of radio waves.

In the embodiment, a length h4 of the array may be 29 mm or more and 31 mm or less, and preferably 29.7 mm, and an interval h5 between a first radiator 233 and a second radiator 234 of the array may be narrower than an interval h6 between a third radiator 235 and a fourth radiator 236, but is not limited thereto.

Figure 5:
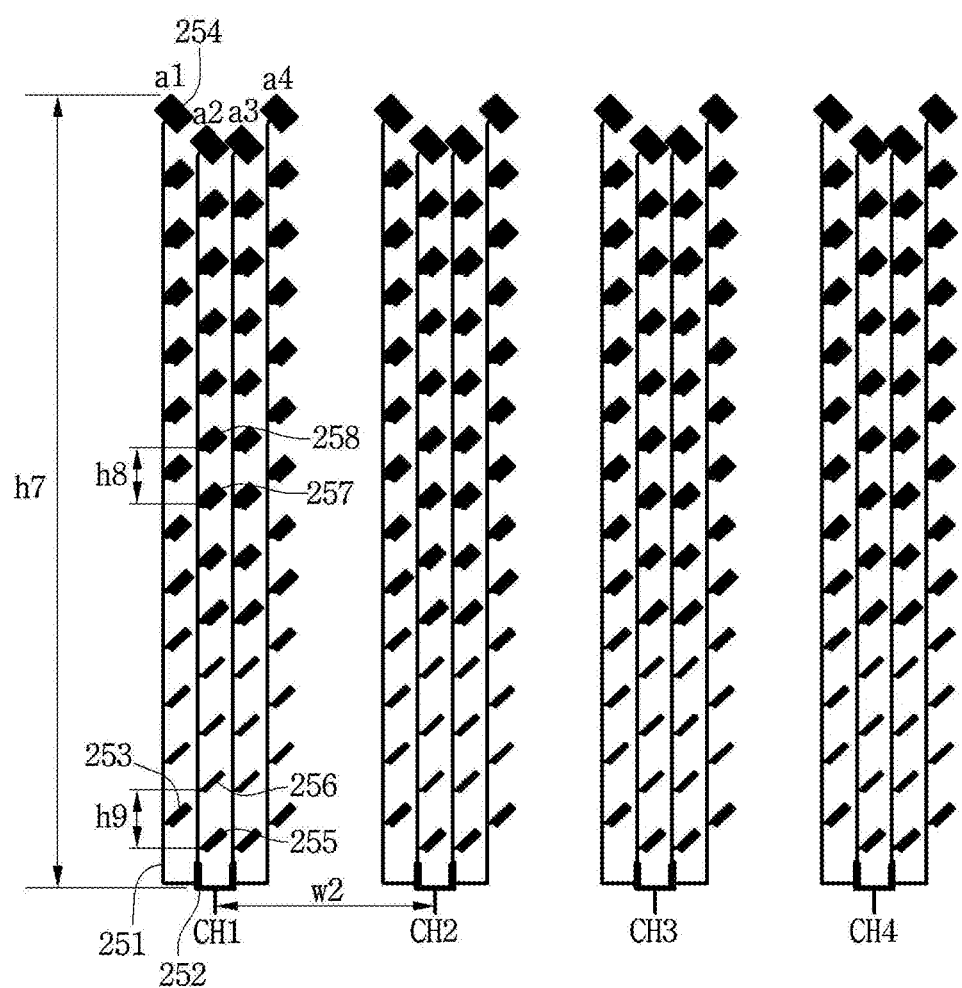
FIG. 5 is a plan view illustrating a long-range receiving antenna according to an embodiment of the present invention.

FIG. 5 is a plan view illustrating a long-range receiving antenna according to an embodiment of the present invention.

Referring to FIG. 5, the long-range receiving antenna 250 may be comprised of a plurality of channels, and each of the plurality of channels may include a plurality of arrays. In an embodiment, the plurality of channels may include four channels and may include, for example, a first channel (CH1), a second channel (CH2), a third channel (CH3) and a fourth channel (CH4). Each of the plurality of channels may include four arrays and may be, for example, a first array a1, a second array a2, a third array a3 and a fourth array a4. The long-range transmitting antenna 220 of FIG. 3 may be the same as at least one of the plurality of channels of the long-range receiving antenna 250. Descriptions of configurations overlapping with FIG. 3 are omitted.

The long-range receiving antenna 250 may include a plurality of feeder lines, a distributing unit, and a plurality of radiators. In the embodiment, a first array a1 may include a feeder line 251, a distributing unit 252, and a plurality of radiators.

The feeder line 251 may be disposed extending from the distributing unit 252 to supply signals to the plurality of radiators. The feeder line 251 is extended in one direction and is arranged in parallel to each other in the other direction. The feeder line 251 is disposed spaced apart from each other at a predetermined distance, and a signal may be transmitted from one end to the other end of the feeder line 251.

The distributing unit 252 is disposed between the signal processing unit 300 and the feeder line 251 and may supply signals to the feeder line 251. The distributing unit 252 may distribute signals to the plurality of feeder lines.

The plurality of radiators may receive signals from the long-range receiving antenna 250. The plurality of radiators may form a radiation pattern of the long-range receiving antenna 250. The plurality of radiators may be dispersedly disposed on the feeder line 251. The plurality of radiators may be arranged along the feeder line 251. The plurality of radiators may be made of a conductive material. Here, the plurality of radiators may include at least one of silver (Ag), palladium (Pd), platinum (Pt), copper (Cu), gold (Au), and nickel (Ni).

In an embodiment, a radiator 253 of the array a1 disposed at an edge of the plurality of arrays may be more spaced apart from the distributing unit 252 than a radiator 255 of the array a2 disposed in the middle. That is, in order to adjust the phases of the plurality of arrays to be equal, the radiator 253 of the array a1 disposed at the edge of the plurality of arrays may be disposed more spaced apart from the distributing unit 252 than the radiator 255 of the array a2 disposed in the middle.

In addition, the radiators 253 and 255 closest to the distributing unit 252 of the plurality of arrays may be disposed spaced apart from the feeder line 251. For example, the radiators 253 and 255 may be implemented as a gap coupled patch antenna to reduce an amount of radiation.

A patch of a radiator 254 disposed farthest from the distributing unit 252 of the plurality of arrays may have the largest size among patches of the plurality of radiators to reduce the side lobe of radio waves.

In an embodiment, the long-range receiving antenna 250 includes four channels, and an interval between the channels may be less than 2λ.

In the embodiment, a length h7 of the first array a1 may be 40 mm or more and 42 mm or less, and preferably 41.6 mm, and an interval h9 between a first radiator 255 and a second radiator 256 of the second array a2 may be narrower than an interval h8 between a third radiator 257 and a fourth radiator 258, but is not limited thereto.

In the embodiment, an interval w2 between the first channel and the second channel may be 7.0 mm or more and 8.0 mm or less, preferably 7.5 mm, but is not limited thereto.

Figure 6:
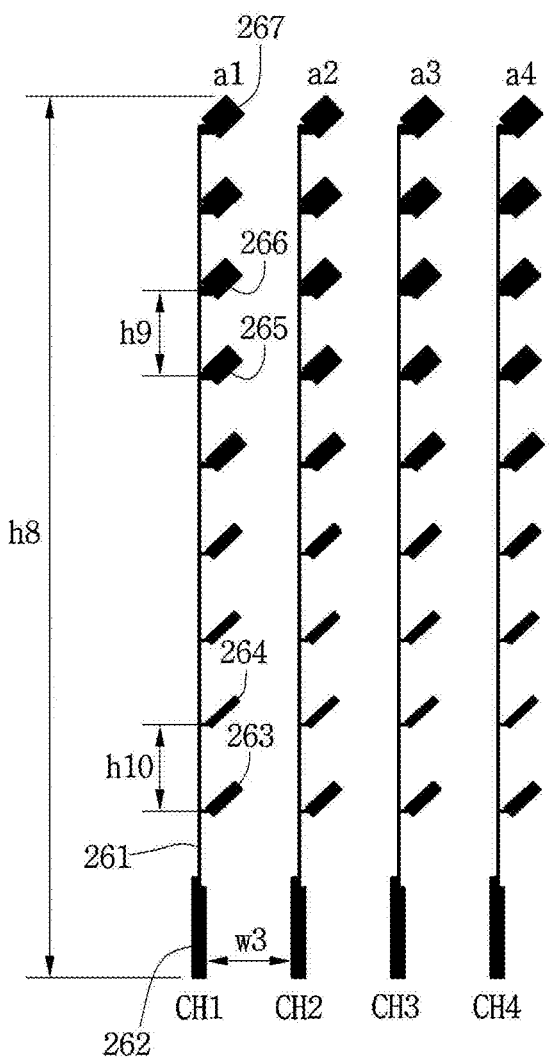
FIG. 6 is a plan view illustrating a short-range receiving antenna according to an embodiment of the present invention.

FIG. 6 is a plan view illustrating a short-range receiving antenna according to an embodiment of the present invention.

Referring to FIG. 6, the short-range receiving antenna 260 may consist of a plurality of channels, and each of the plurality of channels may include one array. In an embodiment, the plurality of channels may include four channels and may include, for example, a first channel (CH1), a second channel (CH2), a third channel (CH3) and a fourth channel (CH4).

The short-range receiving antenna 260 may include a feeder line 261, a distributing unit 262, and a plurality of radiators. The short-range transmitting antenna 230 of FIG. 4 may be the same as at least one of the plurality of channels of the short-range receiving antenna 260. Descriptions of configurations overlapping with FIG. 4 are omitted.

In an embodiment, a radiator 263 closest to the distributing unit 262 of arrays may be disposed spaced apart from the feeder line 261. For example, the radiator 263 may be implemented as a gap coupled patch antenna to reduce an amount of radiation.

A patch of a radiator 267 disposed farthest from the distributing unit 262 of the arrays may have the largest size among patches of the plurality of radiators to reduce the side lobe of radio waves.

In an embodiment, the short-range receiving antenna 260 includes four channels, and an interval between the channels may be less than λ/2.

In the embodiment, a length h8 of the array may be 29 mm or more and 31 mm or less, and preferably 29.7 mm, and an interval h10 between a first radiator 263 and a second radiator 264 of the array may be narrower than an interval h9 between a third radiator 265 and a fourth radiator 266, but is not limited thereto.

Figure 7:
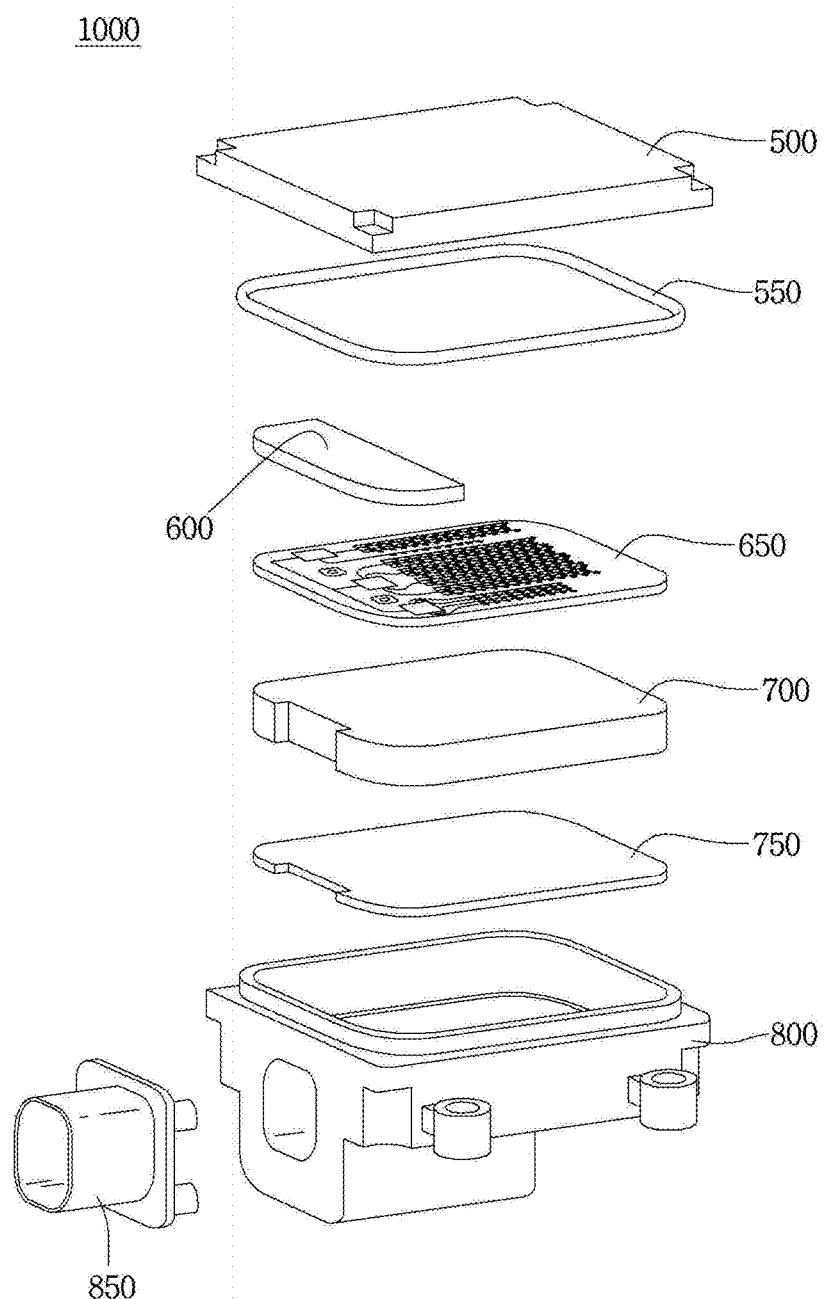
FIG. 7 is a perspective view illustrating a vehicle radar device according to an embodiment of the present invention.

FIG. 7 is a perspective view illustrating a vehicle radar device according to an embodiment of the present invention.

Referring to FIG. 7, a vehicle radar device 1000 may include a radome 500, a waterproof ring 550, a shield unit 600, a printed circuit board (PCB) 650, a bracket 700, an auxiliary PCB 750, a case 800, and a connector 850.

The radome 500 may accommodate the PCB 650 to protect the PCB 650 and the radome 500 may be fastened to the case 800. The radome 500 may be made of a material with low attenuation of radio waves and may be an electric insulator.

The waterproof ring 550 is disposed between the radome 500 and the case 800 to inhibit the vehicle radar device 1000 from being inundated with water. For example, the waterproof ring 550 may be made of an elastic material.

The shield unit 600 may shield a RF signal generated from an IC chip of the PCB 650. For this, the shield unit 600 may be formed in an area corresponding to the IC chip of the PCB 650.

A radar module including an antenna unit and a signal processing unit may be mounted on the PCB 650. The antenna unit may include a plurality of wide-angle antennas arranged in a row, but is not limited thereto. The signal processing unit may be a millimeter-wave radio frequency IC (RFIC), but is not limited thereto.

The bracket 700 may block noise generated during signal processing of the PCB 650.

A circuit for power supply and signal processing may be mounted on the auxiliary PCB 750, but is not limited thereto.

The case 800 may accommodate the connector 850, the auxiliary PCB 750, the bracket 700, the PCB 650, and the shield unit 600.

The connector 850 may transmit and receive signals between the vehicle radar device 1000 and an external apparatus. For example, the connector 850 may be a controller area network (CAN) connector, but is not limited thereto.

Figure 8:
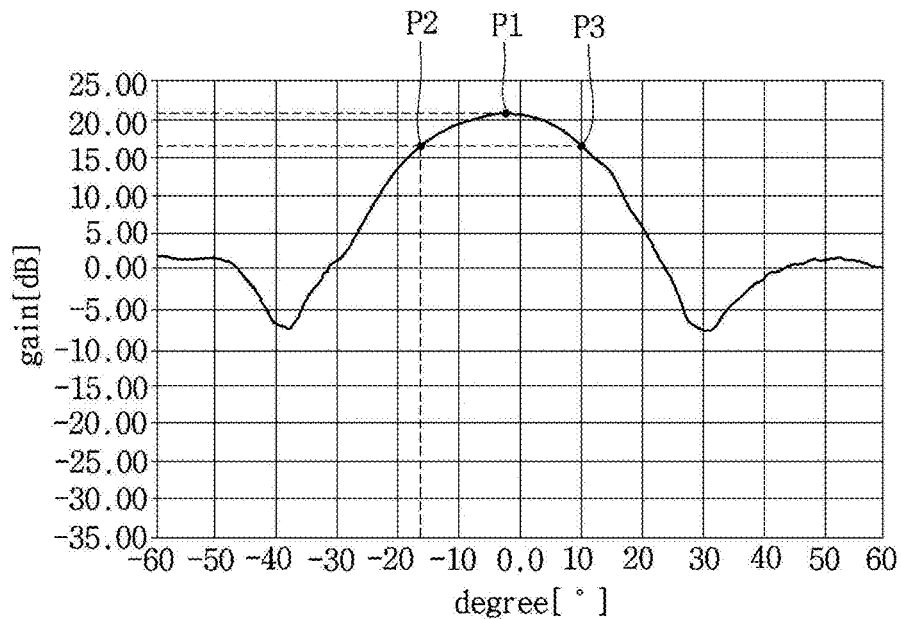
FIG. 8 is a graph illustrating a radiation pattern of a long-range transmitting antenna according to an embodiment of the present invention.

FIG. 8 is a graph illustrating a radiation pattern of a long-range transmitting antenna according to an embodiment of the present invention. Referring to FIG. 8, the long-range transmitting antenna 220 may have a peak point P1 with a gain of 20.71 dB when an angle is −2 degrees, and a beam width may be 20 degrees or more and 22 degrees or less at points P2 and P3 where the gain of the peak point P1 is 3 dB or less. That is, the long-range transmitting antenna 220 according to the embodiment may secure ±10 degrees as a field of view (FOV).

Figure 9:
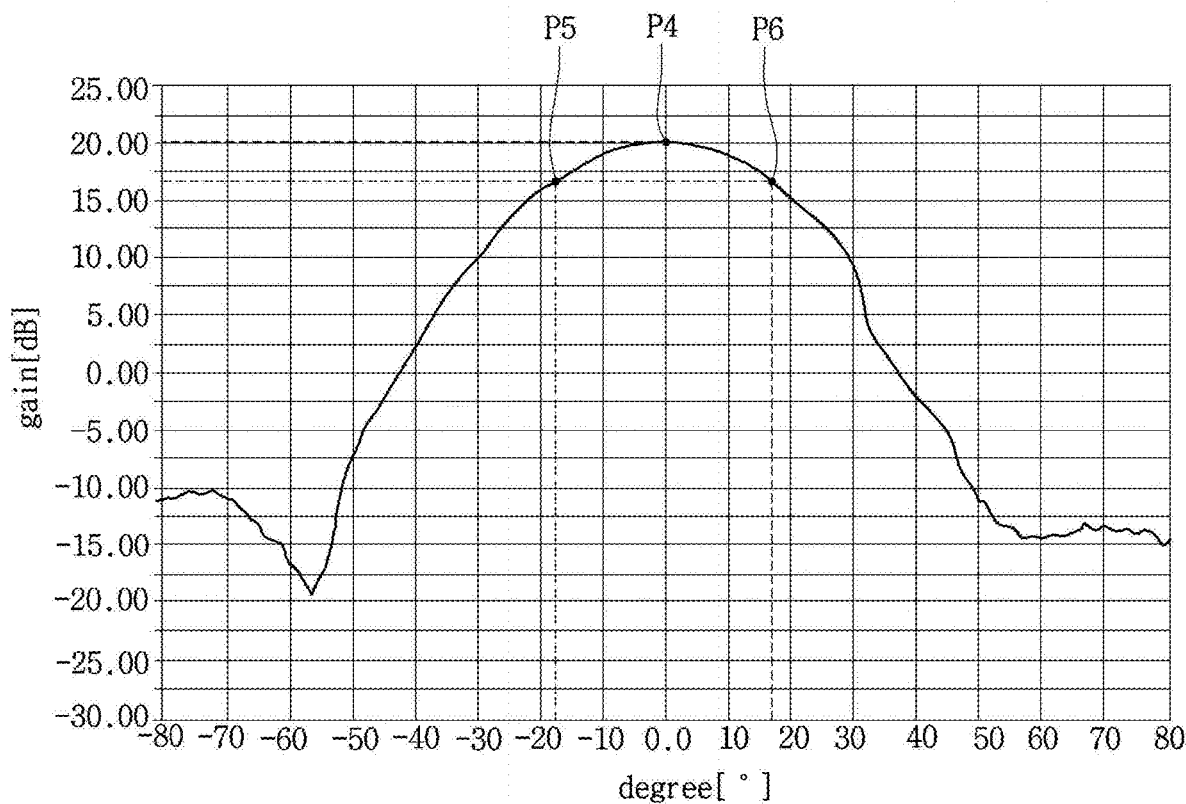
FIG. 9 is a graph illustrating a radiation pattern of a long-range receiving antenna according to an embodiment of the present invention.

FIG. 9 is a graph illustrating a radiation pattern of a long-range receiving antenna according to an embodiment of the present invention. Referring to FIG. 9, the long-range receiving antenna 250 may have a peak point P4 with a gain of 20 dB when an angle is 0 degree, and a beam width may be 31 degrees or more and 33 degrees or less at points P5 and P6 where the gain of the peak point P4 is 3 dB or less. That is, the long-range receiving antenna 250 according to the embodiment may secure ±16 degrees as a field of view (FOV).

Figure 10:
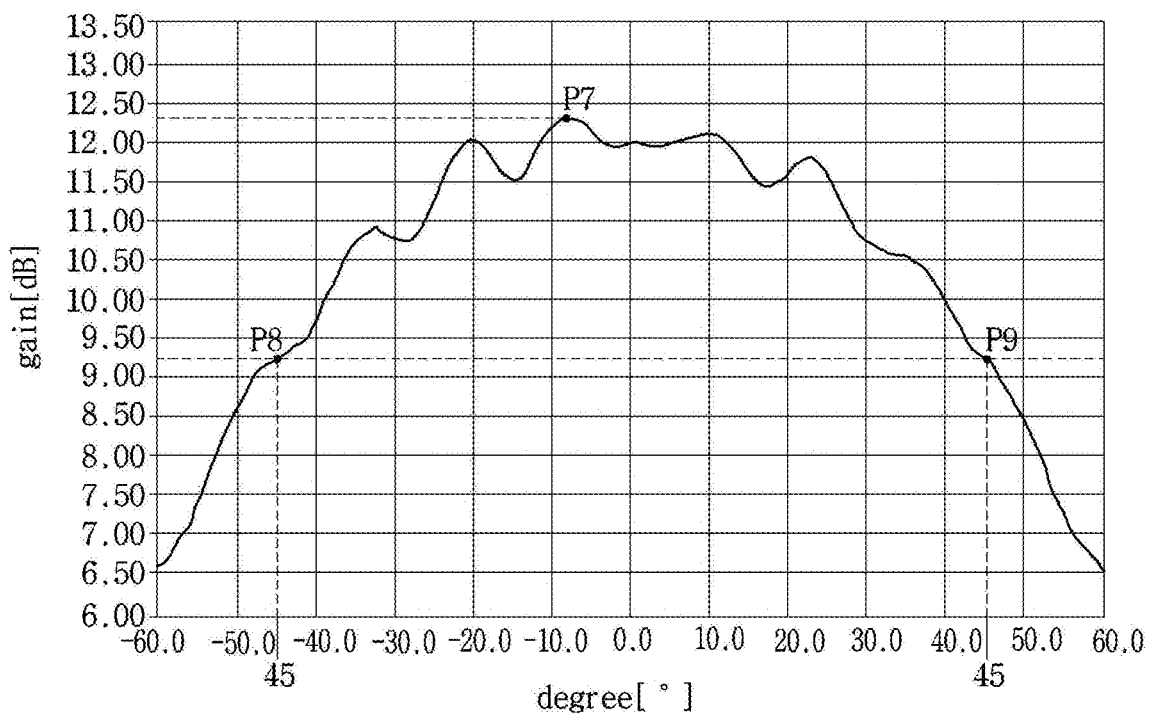
FIG. 10 is a graph illustrating a radiation pattern of a short-range transmitting antenna and receiving antenna according to an embodiment of the present invention.

FIG. 10 is a graph illustrating a radiation pattern of a short-range transmitting antenna and receiving antenna according to an embodiment of the present invention. Referring to FIG. 10, the short-range transmitting antenna 230 and the short-range receiving antenna 260 may have a peak point P7 with a gain of 12 dB when an angle is −9 degrees, and a beam width may be 89 degrees or more and 91 degrees or less at points P8 and P9 where the gain of the peak point P7 is 3 dB or less. That is, the short-range transmitting antenna 230 and the short-range receiving antenna 260 according to the embodiment may secure ±45 degrees as a field of view (FOV).

The above detailed description should not be construed restrictively in all aspects and should be regarded as illustrative. The scope of the present invention should be determined by reasonable interpretation of the appended claims, and all changes within the equivalent scope of the present invention are included in the scope of the present invention.

The invention claimed is:

1. A radar module, comprising:
an antenna unit including a transmitting antenna unit and a receiving antenna unit; and
a signal processing unit connected to the antenna unit and processing a transmission signal and a reception signal,
wherein the transmitting antenna unit consists of a long-range transmitting antenna and a short-range transmitting antenna of a single channel, and the receiving antenna unit consists of a long-range receiving antenna and a short-range receiving antenna of a plurality of channels,
wherein the long-range transmitting antenna includes:
a plurality of feeder lines constituting a plurality of arrays;
a distributing unit connecting between the plurality of feeder lines and the signal processing unit; and
a plurality of radiators each disposed on the plurality of feeder lines,
wherein a radiator of a first array arranged at an edge of the plurality of arrays is not aligned within a horizontal direction with a radiator of a second array arranged in a middle of the plurality of arrays.

2. The radar module of claim 1, wherein the long-range receiving antenna includes four channels, and an interval between the channels is less than 2λ.

3. The radar module of claim 1, wherein the short-range receiving antenna includes four channels, and an interval between the channels is less than λ/2.

4. The radar module of claim 1,
wherein a radiator of the first array is positioned between radiators of the second array within the horizontal direction.

5. The radar module of claim 1, wherein a radiator closest to the signal processing unit among the plurality of radiators is disposed spaced apart from the plurality of feeder lines.

6. The radar module of claim 2, wherein a radiator farthest from the signal processing unit among the plurality of radiators has a largest radiation patch among the plurality of radiators.

7. The radar module of claim 1, wherein a length of the long-range transmitting antenna is longer than a length of the short-range transmitting antenna.

8. The radar module of claim 1, wherein a length of the long-range receiving antenna is longer than a length of the short-range receiving antenna.

9. The radar module of claim 4, wherein a radiator of an array disposed at an edge of the plurality of arrays is more spaced apart from the distributing unit than a radiator of an array disposed in the middle.

10. The radar module of claim 1, wherein an interval between the first array and the second array that are adjacent to each other is 1.6 mm or more and 1.8 mm or less.

11. The radar module of claim 1, wherein as the second array extends farther away from the distributing unit, an interval between the radiators of the second array is narrowed.

12. The radar module of claim 1, wherein a radiator disposed at an uppermost end of radiators of the first array is positioned higher than a radiator disposed at an uppermost end of radiators of the second array.

13. A vehicle radar device, comprising:
a case;
a PCB which is accommodated in the case and in which an antenna unit and a signal processing unit are mounted; and
the antenna unit including a transmitting antenna unit and a receiving antenna unit,
wherein the transmitting antenna unit consists of a long-range transmitting antenna and a short-range transmitting antenna of a single channel, and the receiving antenna unit consists of a long-range receiving antenna and a short-range receiving antenna of a plurality of channels,
wherein the long-range transmitting antenna includes:
a plurality of feeder lines constituting a plurality of arrays;
a distributing unit connecting between the plurality of feeder lines and the signal processing unit; and
a plurality of radiators each disposed on the plurality of feeder lines,
wherein a radiator disposed at an uppermost end of radiators of the first array is positioned higher than a radiator disposed at an uppermost end of radiators of the second array.

14. The vehicle radar device of claim 13, wherein the long-range receiving antenna includes four channels, and an interval between the channels is less than 2λ.

15. The vehicle radar device of claim 13, wherein the short-range receiving antenna includes four channels, and an interval between the channels is less than λ/2.

16. The vehicle radar device of claim 13,
wherein a radiator of the first array is positioned between radiators of the second array within the horizontal direction.

17. The vehicle radar device of claim 13, wherein a length of the long-range transmitting antenna is longer than a length of the short-range transmitting antenna.

18. The vehicle radar device of claim 13, wherein a length of the long-range receiving antenna is longer than a length of the short-range receiving antenna.

19. The vehicle radar device of claim 16, wherein a radiator of an array disposed at an edge of the plurality of arrays is more spaced apart from the distributing unit than a radiator of an array disposed in the middle.

20. The vehicle radar device of claim 13, wherein a radiator of a first array arranged at an edge of the plurality of arrays is not aligned within a horizontal direction with a radiator of a second array arranged in a middle of the plurality of arrays,
wherein an interval between the first array and the second array that are adjacent to each other is 1.6 mm or more and 1.8 mm or less, and
wherein as the second array extends farther away from the distributing unit, an interval between the radiators of the second array is narrowed.

* * * * *